UNITED STATES PATENT OFFICE.

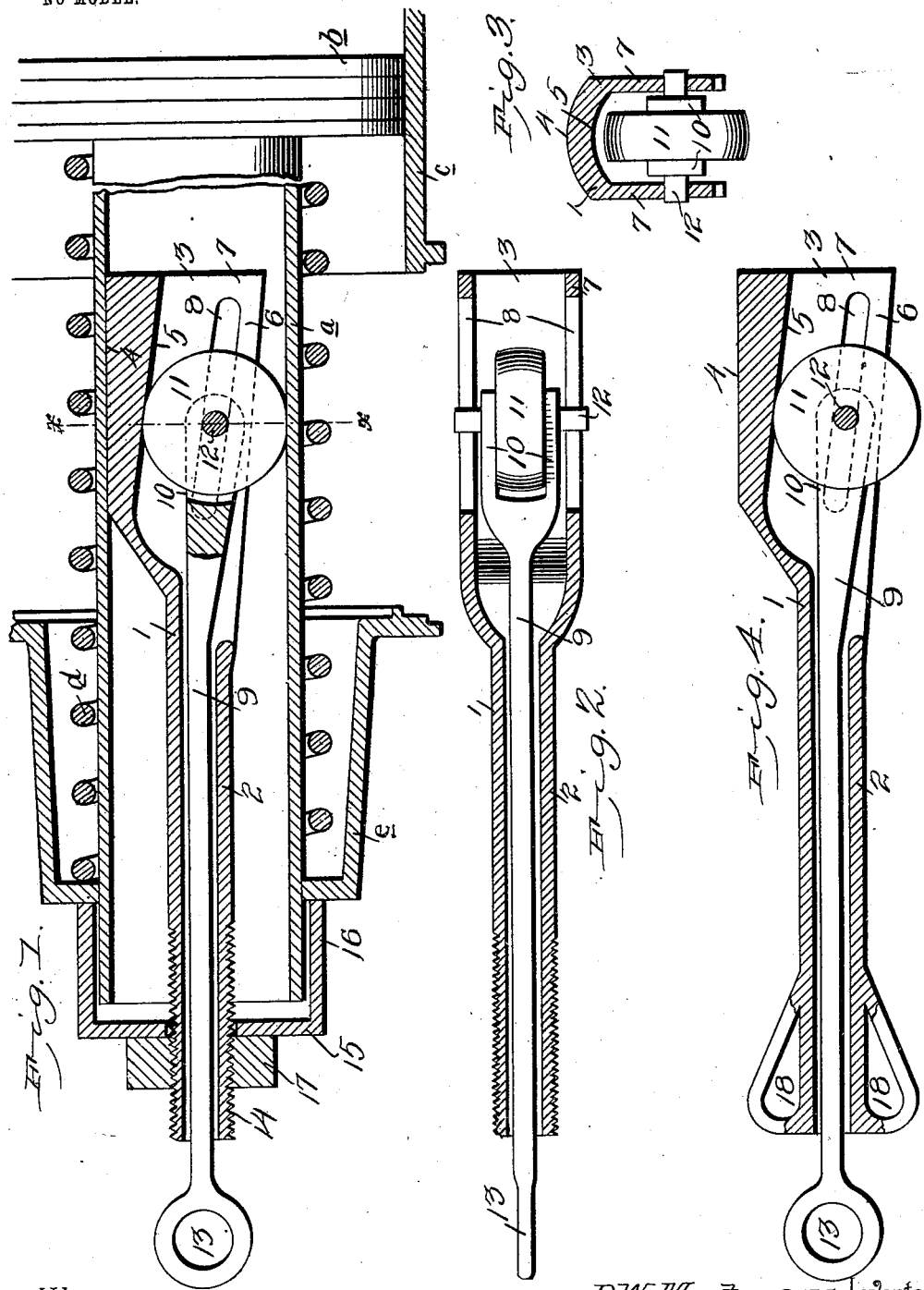

BERNARD W. MASTERSON, OF SAN ANTONIO, TEXAS.

INSIDE PIPE-CLAMP.

SPECIFICATION forming part of Letters Patent No. 725,739, dated April 21, 1903.

Application filed August 2, 1902. Serial No. 118,151. (No model.)

*To all whom it may concern:*

Be it known that I, BERNARD W. MASTERSON, a citizen of the United States, residing at San Antonio, in the county of Bexar and State of Texas, have invented a new and useful Inside Pipe-Clamp, of which the following is a specification.

My invention is an improved pipe-clamp adapted to be inserted in a pipe and expanded to frictionally engage the inner side thereof, the object of the invention being to provide a construction which, while being adapted for clamping pipes and tubes of all kinds, will be particularly useful and convenient for drawing tubes from wells and for removing air-brake pistons, such as are commonly used in the compressed-air brakes of railway-cars.

In the accompanying drawings, Figure 1 is a longitudinal sectional view of a pipe-clamp embodying my improvements, showing the same engaged with the tubular stem of the piston in a brake-cylinder. Fig. 2 is a similar view of my improved clamp, taken on a plane at right angles to that of Fig. 1. Fig. 3 is a detail transverse sectional view of the same, taken on a plane indicated by the line $x\ x$ of Fig. 1. Fig. 4 is a longitudinal sectional view of a modified form of my improved pipe-clamp.

In the construction of my improved pipe-clamp I provide a gripping member 1, which comprises a tubular stem 2, at the inner end of which is a shoe 3. The latter has a gripping-face 4 on one side, is formed with a wedge 5, and is open on one side, as at 6, the opening 6 extending longitudinally through the said shoe and communicating with the inner end of the bore of the tubular stem 2. The sides 7 of the shoe are provided with longitudinal slots 8, which are parallel with the wedge-face 5 of the shoe and are of suitable length. A longitudinally-movable rod 9 is extended through the bore of the tubular stem 2, is adapted to play back and forth therein, and has its inner end forked to provide a pair of arms 10. A roller 11 has an axle 12, the ends of which project from opposite sides thereof. This roller is mounted between the arms 10, its axle having its bearings in the said arms, and the ends of the roller-axle extend into and engage the slots 8 of the shoe. It will be understood from the foregoing and by reference to the drawings that the roller is disposed in the longitudinal opening 6 in the shoe, the latter forming the housing for the roller. One side of the roller projects beyond the open side of the shoe opposite the wedge 5, and the opposite side of the periphery of said roller engages the said wedge. The rod 9 is here shown as provided at its outer end with an eye or knob 13, whereby it may be readily grasped and operated.

In order to engage my improved clamp with a pipe, the same is placed inside the pipe at one end thereof and the rod 9 operated to move the same longitudinally with reference to the gripping member to cause the roller 11 to move in the required direction to engage the face 4 with one side of the bore of the pipe and the roller against the opposite side thereof, this being accomplished by the coaction of the roller with the wedge 5, as will be readily understood. In order to release the clamp from the pipe, the rod 9 is moved outwardly, thereby causing the roller to move toward the thin end of the wedge, and hence disengage the said roller and the gripping or friction face 4 of the shoe from the bore or pipe.

In Fig. 1 of the drawings the clamp is shown engaged with the tubular stem $a$ of the piston $b$ in a brake-cylinder $c$. As is well known, the piston is held normally in one position by a coiled spring $d$, which encircles the stem $a$ and bears at its ends against the piston and the cylinder-head $e$, respectively. The outer portion of the tubular stem 2 is screw-threaded, as at 14, and passed through a central opening in a follower 15, which has fingers or stops 16, that bear against the outer end of the cylinder-head. On the threaded projecting end of the stem 2 is screwed a nut 17, which bears against the follower 15. It will be understood that when the cylinder-head is disengaged from the cylinder the follower will prevent the spring from throwing the cylinder-head off from the stem and against the operator.

In Fig. 4 of the drawings I show a modified form of my improved pipe-clamp, in which the stem 2 of the gripping member 1 is provided at its outer end with a series of radially-disposed eyes 18, forming a head, by means of which said member 1 may be grasped and manipulated.

I do not desire to limit myself to the precise construction and combination of devices herein shown and described, as it is evident that modifications may be made therein without departing from the spirit of my invention and within the scope of the appended claims.

Having thus described my invention, I claim—

1. A pipe-clamp of the class described comprising a gripping member having a wedge, a longitudinally-movable member, and a roller connected to the latter and engaging the face of the wedge, the latter and the roller coacting to expand the implement, substantially as described.

2. A pipe-clamp of the class described comprising a gripping member having a tubular shank and a shoe at the inner end thereof, one side of the shoe being a wedge, a longitudinally-movable member extending through the tubular shank and into the shoe, and a roller carried by the longitudinally-movable member and disposed in the shoe of the gripping member, one side of said roller engaging the wedge-face of the shoe and the other side thereof projecting from the side of the shoe opposite the wedge, substantially as described.

3. An implement of the class described comprising a gripping member having a wedge, a longitudinally-movable member, a roller connected to the latter and engaging and disposed to travel on the face of the wedge, a follower, and means to connect the same to and adjust the same longitudinally on the gripping member, substantially as described.

4. An implement of the class described comprising a gripping member having a tubular externally-threaded shank and a shoe at the inner end thereof, one side of the shoe being a longitudinally-disposed wedge, a longitudinally-movable member extending through the tubular shank and into the shoe, a roller connected to and operated by said longitudinally-movable member, said roller engaging and being disposed to travel on the face of the wedge, a follower slidably connected to the tubular shank and an adjusting-nut on the latter to bear against and adjust the follower, substantially as described.

5. In implement of the class described comprising a gripping member having an outwardly-extended shank, a shoe at the inner end thereof formed with a longitudinally-disposed wedge, the outer side of which forms a friction-face, said shoe having a longitudinal slot or opening in one side thereof, the side walls of which are provided with slots parallel with the inner face of the wedge, a rod movable longitudinally with respect to the said gripping member and a roller connected to and operated by said rod, the axle of the roller engaging and being disposed to travel in the slots in the sides of the shoe, said roller engaging the face of the wedge, substantially as described.

In testimony that I claim the foregoing as my own I have hereto affixed my signature in the presence of two witnesses.

BERNARD W. MASTERSON.

Witnesses:
F. E. KENNY,
D. H. CRIER.